(12) United States Patent
Luo et al.

(10) Patent No.: US 7,414,450 B2
(45) Date of Patent: *Aug. 19, 2008

(54) SYSTEM AND METHOD FOR ADAPTIVE POWER SUPPLY TO REDUCE POWER CONSUMPTION

(75) Inventors: Wenzhe Luo, Shanghai (CN); Paul Ouyang, Shanghai (CN); Feng Chen, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 435 days.

This patent is subject to a terminal disclaimer.

(21) Appl. No.: 11/251,107

(22) Filed: Oct. 13, 2005

(65) Prior Publication Data

US 2007/0058084 A1    Mar. 15, 2007

(30) Foreign Application Priority Data

Sep. 15, 2005    (CN) .................... 2005 1 0029767

(51) Int. Cl.
*H03H 11/26* (2006.01)
*G01R 35/04* (2006.01)

(52) U.S. Cl. .................. 327/277; 327/105; 702/107; 702/64

(58) Field of Classification Search ......... 323/282–287, 323/224; 713/501, 503, 320, 322, 600, 601; 395/750, 550, 595; 327/102, 158, 262, 356, 327/537, 277; 702/45, 64, 66, 77, 107, 117
See application file for complete search history.

(56) References Cited

U.S. PATENT DOCUMENTS

| 5,623,198 | A  | * | 4/1997 | Massie et al. | ............... 323/282 |
| 7,237,129 | B2 | * | 6/2007 | Fung | .......................... 713/323 |

* cited by examiner

*Primary Examiner*—Rajnikant B Patel
(74) *Attorney, Agent, or Firm*—Townsend and Townsend and Crew LLP

(57) ABSTRACT

A system and method for adaptively providing a power supply voltage. The system includes an oscillator configured to receive an output voltage and generate a firs signal. The first signal is associated with a first frequency and a first period. Additionally, the system includes a frequency comparator configured to receive the first signal associated with the first frequency and a second signal associated with a second frequency and to generate a third signal if the first frequency and the second frequency are not equal, and a voltage regulator coupled to the frequency comparator and configured to generate the output voltage based on at least information associated with the third signal. The output voltage is received by a powered system, and the powered system is configured to receive a clock signal associated with a clock frequency. The clock frequency is equal to the second frequency.

23 Claims, 3 Drawing Sheets

SYSTEM AND METHOD FOR ADAPTIVE POWER SUPPLY TO REDUCE POWER CONSUMPTION

CROSS-REFERENCES TO RELATED APPLICATIONS

This application claims priority to Chinese Patent Application No. 200510029767.8, filed Sep. 15, 2005, commonly assigned, incorporated by reference herein for all purposes.

The following two commonly-owned co-pending applications, including this one, are being filed concurrently and the other one is hereby incorporated by reference in its entirety for all purposes:

1. U.S. patent application Ser. No. 11/251,107, in the name of Wenzhe Luo, Paul Ouyang, and Feng Chen, titled, "System and Method for Adaptive Power Supply to Reduce Power Consumption,"; and
2. U.S. patent application Ser. No. 11/251,583, in the name of Wenzhe Luo, Paul Ouyang, and Feng Chen, titled, "System and Method for Providing Adaptive Power Supply to System on a Chip,".

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to integrated circuits. More particularly, the invention provides a system and method for adaptive power supply. Merely by way of example, the invention has been applied to an adaptive power supply loop. But it would be recognized that the invention has a much broader range of applicability.

Integrated circuits or "ICs" have evolved from a handful of interconnected devices fabricated on a single chip of silicon to millions of devices. Current ICs provide performance and complexity far beyond what was originally imagined. In order to achieve improvements in complexity and circuit density (i.e., the number of devices capable of being packed onto a given chip area), the size of the smallest device feature, also known as the device "geometry", has become smaller with each generation of ICs. Semiconductor devices are now being fabricated with features less than a quarter of a micron across.

Increasing circuit density has not only improved the complexity and performance of ICs but has also provided lower cost parts to the consumer. An IC fabrication facility can cost hundreds of millions, or even billions, of dollars. Each fabrication facility will have a certain throughput of wafers, and each wafer will have a certain number of ICs on it. Therefore, by making the individual devices of an IC smaller, more devices may be fabricated on each wafer, thus increasing the output of the fabrication facility. Making devices smaller is very challenging, as a given process, device layout, and/or system design often work down to only a certain feature size.

An example of such a limit is power consumption of an integrated circuit system. The power consumption has increased as the performance of the integrated circuit system has improved. But the integrated circuit system is often required to consume a low level of power. For example, the integrated circuit system is portable and thus relies on battery power supply. The portable system may be a laptop computer, a personal data assistant (PDA), a cell phone, a digital camera, a camcorder, or any other device.

These competing demands for high performance and low power consumption have placed significant constraints on system design. Consequently, certain conventional techniques have been used to reduce power consumption. For example, the system turns off some parts that are not in use. In another example, the clock frequency for the system is reduced when the system does not have to perform many tasks. The clock speed often needs to be high enough to support the system for necessary functions. In yet another example, the clock frequency for the system is adjusted based on at least information associated with a workload of the system. In yet another example, the design architecture of the system is modified in order to efficiently utilize the current. In yet another example, the circuit design or device layout is modified to reduce the unused current. In yet another example, the device design is changed to lower the leakage current. But these techniques often increases system complexity with limited effectiveness.

From the above, it is seen that an improved technique for power supply is desired.

BRIEF SUMMARY OF THE INVENTION

The present invention is directed to integrated circuits. More particularly, the invention provides a system and method for adaptive power supply. Merely by way of example, the invention has been applied to an adaptive power supply loop. But it would be recognized that the invention has a much broader range of applicability.

In a specific embodiment, the invention provides a system for adaptively providing a power supply voltage. The system includes an oscillator configured to receive an output voltage and generate a firs signal. The first signal is associated with a first frequency and a first period. Additionally, the system includes a frequency comparator configured to receive the first signal associated with the first frequency and a second signal associated with a second frequency and to generate a third signal if the first frequency and the second frequency are not equal, and a voltage regulator coupled to the frequency comparator and configured to generate the output voltage based on at least information associated with the third signal. The output voltage is received by a powered system, and the powered system is configured to receive a clock signal associated with a clock frequency. The clock frequency is equal to the second frequency. The powered system includes a first signal path associated with a first time delay, and the first period is equal to or longer than the first time delay. The output voltage is adjusted if the first frequency and the second frequency are not equal.

According to another embodiment, a system for adaptively providing a power supply voltage includes an oscillator including a first signal path associated with a first time delay and configured to receive an output voltage and generate a firs signal. The first signal is associated with a first frequency and a first period, and the first time delay is substantially equal to the first period. Additionally, the system includes a frequency comparator configured to receive the first signal associated with the first frequency and a second signal associated with a second frequency and to generate a third signal if the first frequency and the second frequency are not equal, and a voltage regulator coupled to the frequency comparator and configured to adjust the output voltage if the first frequency and the second frequency are not equal. The output voltage is received by a powered system, and the powered system is configured to receive a clock signal associated with a clock frequency and adjust the clock frequency based on at least information associated with a workload of the powered system. The clock frequency is equal to the second frequency. The powered system includes a second signal path associated with a second time delay, and the first period is equal to or longer than the second time delay.

According to yet another embodiment, a method for adaptively providing a power supply voltage includes receiving an output voltage, and generating a first signal based on at least information associated with the output voltage. The first signal is related to a first frequency and a first period. Additionally, the method includes receiving the first signal associated with the first frequency and a second signal associated with a second frequency, and comparing the first frequency and the second frequency to at least determine whether the first frequency and the second frequency are equal. Moreover, the method includes generating a third signal if the first frequency and the second frequency are not equal, processing information associated with the third signal, and generating the output voltage based on at least information associated with the third signal. The generating the output voltage includes adjusting the output voltage if the first frequency and the second frequency are not equal. The output voltage is received by a powered system, and the powered system is configured to receive a clock signal associated with a clock frequency. The clock frequency is equal to the second frequency. The powered system includes a first signal path associated with a first time delay, and the first period is equal to or longer than the first time delay.

Many benefits are achieved by way of the present invention over conventional techniques. Some embodiments of the present invention provide system and method for adaptively providing power supply. Certain embodiments of the present invention can significantly lower power consumption of a powered system. Some embodiments of the present invention identify the critical path of a system powered by a power supply voltage, and determine the time delay of a delay path also powered by the power supply level voltage. For example, the time delay of the delay path is either equal to or longer than the time delay of the critical path. In anther example, the time delay of the delay path is compared with the clock period of the powered system to ensure that the time delay of the critical path is equal to or shorter than the clock period. Certain embodiments of the present invention use a feedback loop to adaptively adjust a power supply voltage. For example, the feedback loop ensures a powered system to be provided with the lowest power supply voltage. In another example, the feedback loop operates based on the principal that the power supply voltage should be adjusted to the minimum level so long as the time delay of the critical path of a powered system is either equal to or short than the period of a clock signal provided to the powered system. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention is directed to integrated circuits. More particularly, the invention provides a system and method for adaptive power supply. Merely by way of example, the invention has been applied to an adaptive power supply loop. But it would be recognized that the invention has a much broader range of applicability.

Figure 1:
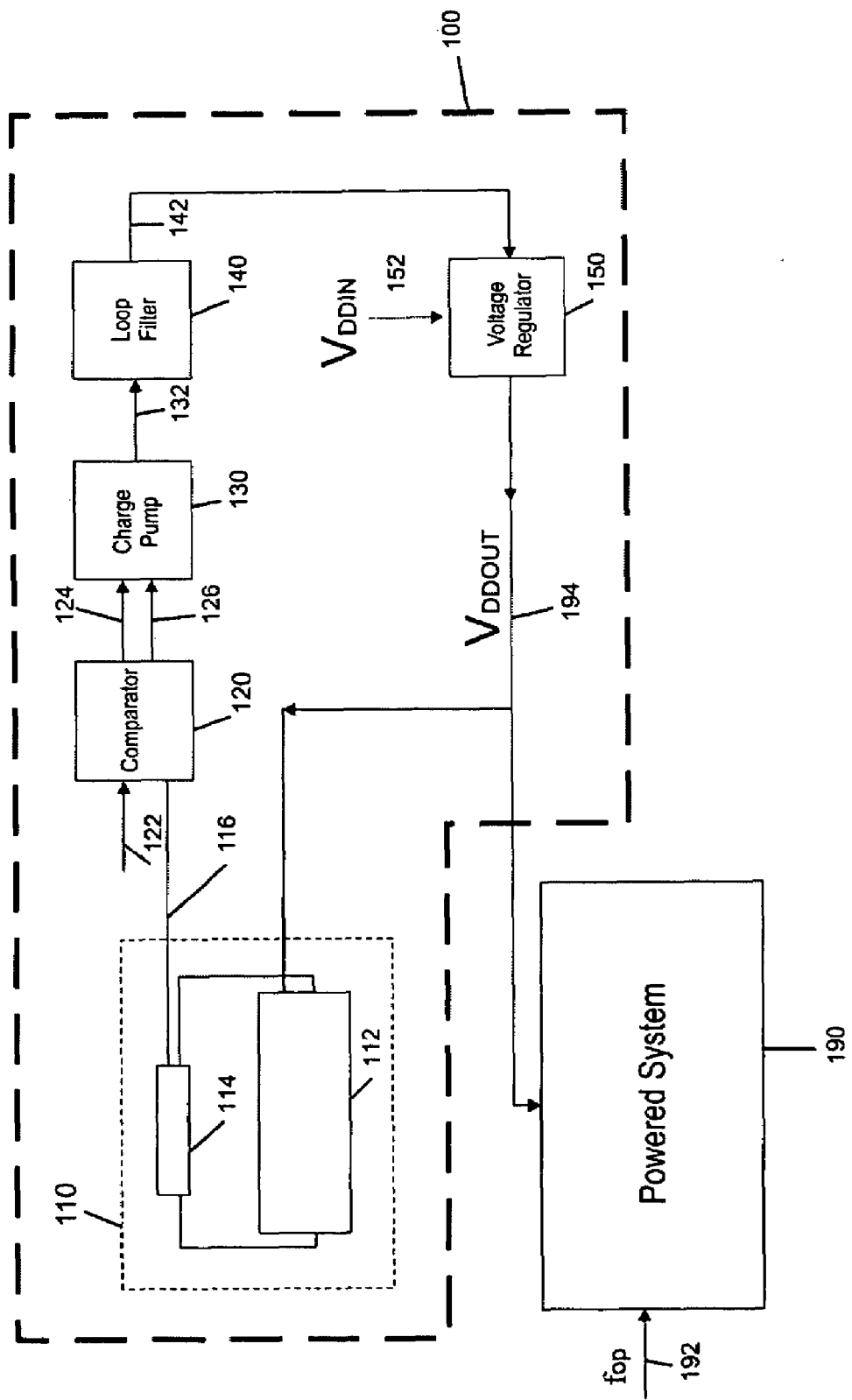
FIG. 1 is a simplified system for adaptive power supply according to an embodiment of the present invention.

FIG. 1 is a simplified system for adaptive power supply according to an embodiment of the present invention. This diagram is merely an example, which should not unduly limit the scope of the claims. One of ordinary skill in the art would recognize many variations, alternatives, and modifications. The system 100 includes the following components:

1. Oscillator 110;
2. Frequency comparator 120;
3. Charge pump 130;
4. Loop filter 140;
5. Voltage regulator 150.

Although the above has been shown using a selected group of components for the system 100, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

As shown in FIG. 1, the system 100 is used to adaptively supply power to a powered system 190. In one embodiment, the powered system 190 is an integrated circuit system. In another embodiment, the powered system 190 includes one or more blocks of an integrated circuit system. In yet another embodiment, the powered system 190 can slow down the system clock when the powered system 190 does not have to perform many tasks. In yet another embodiment, the powered system 190 adjusts the clock frequency based on at least information associated with a workload of the powered system 190. The powered system 190 receives a clock signal 192 with a frequency $f_{op}$, and an output power supply voltage 194 of $V_{DDOUT}$ from the system 100.

The oscillator 110 includes a delay path 112 and other oscillator components 114. Other oscillator components 114 are coupled to the delay path 112, and generate a signal 116 with a frequency $f_{var}$. In one embodiment, the frequency $f_{var}$ is approximately equal to about $1/t_{delay}$. $t_{delay}$ represents time delay of the delay path 112. For example, it would take a signal $t_{delay}$ to travel through the delay path 112. As shown in FIG. 1, the delay path 112 receives the output power supply voltage 194 of $V_{DDOUT}$. For example, $t_{delay}$ depends on $V_{DDOUT}$.

In one embodiment, the powered system 190 includes a critical path whose time delay is longer than the time delay of any other signal path of the powered system 190. In another embodiment, the time delay $t_{delay}$ equals the time delay of the critical path of the powered system 190. For example, the time delay $t_{delay}$ is longer than the time delay of the critical path of the powered system 190 by a predetermined period. In another example, both the critical path of the powered system 190 and the delay path 112 are powered by the output power supply voltage 194 of $V_{DDOUT}$.

The frequency comparator 120 receives the signal 116 with the frequency $f_{var}$ and a signal 122 with the frequency $f_{op}$. For example, the signal 122 is the same as the signal 192. The frequency comparator 120 compares the two frequencies $f_{var}$ and $f_{op}$, and in response can send no signal, or one or more signals to the charge pump 130 through a signal path 122 and/or a signal path 124. In one embodiment, the frequency comparator 120 includes a phase-frequency detector. The phase-frequency detector compares the edges of the two signals 116 and 122 to determine whether the frequency $f_{var}$ is higher than, equal to, or lower than the frequency $f_{op}$. In another embodiment, if $f_{var}$ is lower than $f_{op}$, the frequency comparator 120 sends an up signal through the signal path 124. If $f_{var}$ is higher than $f_{op}$, the frequency comparator 120 generates a down signal through the signal path 126. If $f_{var}$ is equal to $f_{op}$, the frequency comparator 120 does not send the up signal or the down signal. In yet another embodiment, the up signal can cause the system 100 to raise the output power supply voltage 194 of $V_{DDOUT}$, and the down signal can cause the system 100 to lower the output power supply voltage 194 of $V_{DDOUT}$. In yet another embodiment, the up signal and the down signal each include signal pulses.

The charge pump 130 is coupled to the comparator 120 through the signal paths 124 and 126, and is coupled to the loop filter 140 through a current path 132. If the charge pump 130 receives the up signal, the charge pump 130 generates a sourcing current flowing from the charge pump 130 to the loop filter 140 over the current path 132. If the charge pump 130 receives the down signal, the charge pump 130 generates a sinking current flowing from the loop filter 140 to the charge pump 130 over the current path 132. If the charge pump 130 does not receive the up signal or the down signal, the charge pump 130 does not generate the sourcing current or the sinking current.

The loop filter 140 can receive and integrate the sourcing current or the sinking current and generate a reference voltage 142 Of $V_{ref}$. For example, the loop filter 140 uses a damping process. In another example, the loop filter 140 uses a smoothing process to improve stability of the reference voltage 142. The reference voltage 142 is sent to the voltage regulator 150.

Figure 2:
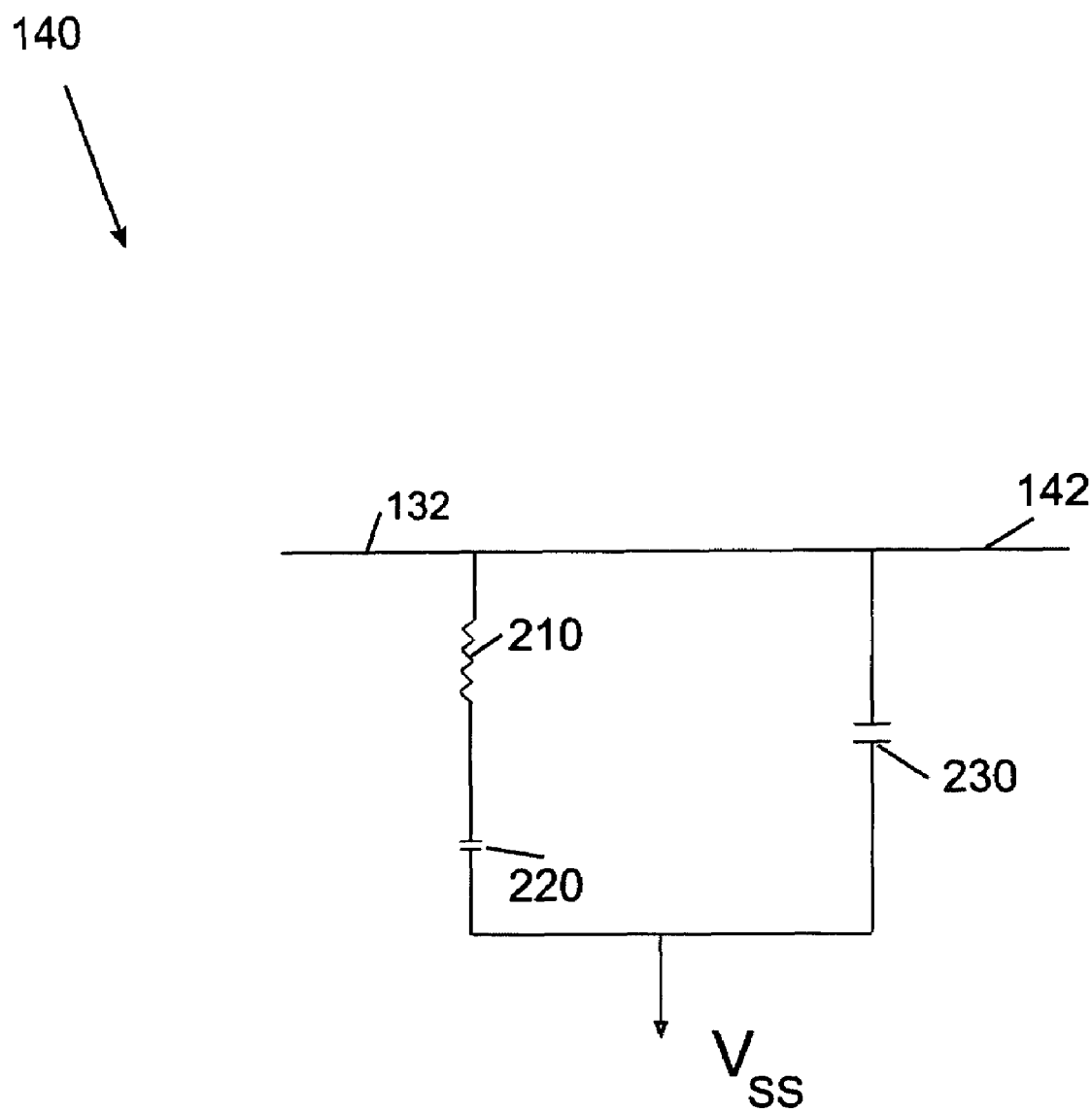
FIG. 2 is a simplified diagram showing a loop filter as part of a system for adaptive power supply according to an embodiment of the present invention.

FIG. 2 is a simplified diagram showing the loop filter 140 as part of the system 100 according to an embodiment of the present invention. This diagram is merely an example, which should not unduly limit the scope of the claims. One of ordinary skill in the art would recognize many variations, alternatives, and modifications. The loop filter 140 includes a resistor 210 and capacitors 220 and 230. The resistor 210 and the capacitor 220 are in series, and the capacitors 220 and 230 each have one terminal coupled to a voltage level of $V_{SS}$. For example, $V_{SS}$ represents the ground level. As shown in FIG. 2, the loop filter 140 is coupled to the charge pump through the current path 132, and sends the reference voltage 142 of $V_{ref}$ to the voltage regulator 150. Although the above has been shown using a selected group of components for the system 100, there can be many alternatives, modifications, and variations. For example, some of the components may be expanded and/or combined. Other components may be inserted to those noted above. Depending upon the embodiment, the arrangement of components may be interchanged with others replaced.

Returning to FIG. 1, the voltage regulator 150 receives the reference voltage 142 of $V_{ref}$, and an input power supply voltage 152 of $V_{DDIN}$. In response to the reference voltage 142, the voltage regulator 150 converts the input power supply voltage 152 of $V_{DDIN}$ to the output power supply voltage 194 of $V_{DDOUT}$. In one embodiment, $V_{DDOUT}$ has a linear relationship with $V_{ref}$. For example, $V_{DDOUT}$ equals $V_{ref}$ multiplied by a constant. In another example, $V_{DDOUT}$ equals $V_{ref}$ plus a constant. In yet another example, $V_{DDOUT}$ equals a first constant plus the product of $V_{ref}$ and a second constant. In another embodiment, the output power supply voltage 194 is used to power both the critical path of the powered system 190 and the delay path 112 of the oscillator 110. In yet another embodiment, the voltage regulator 150 includes a linear regulator and/or a switching-capacitor regulator.

Figure 3:
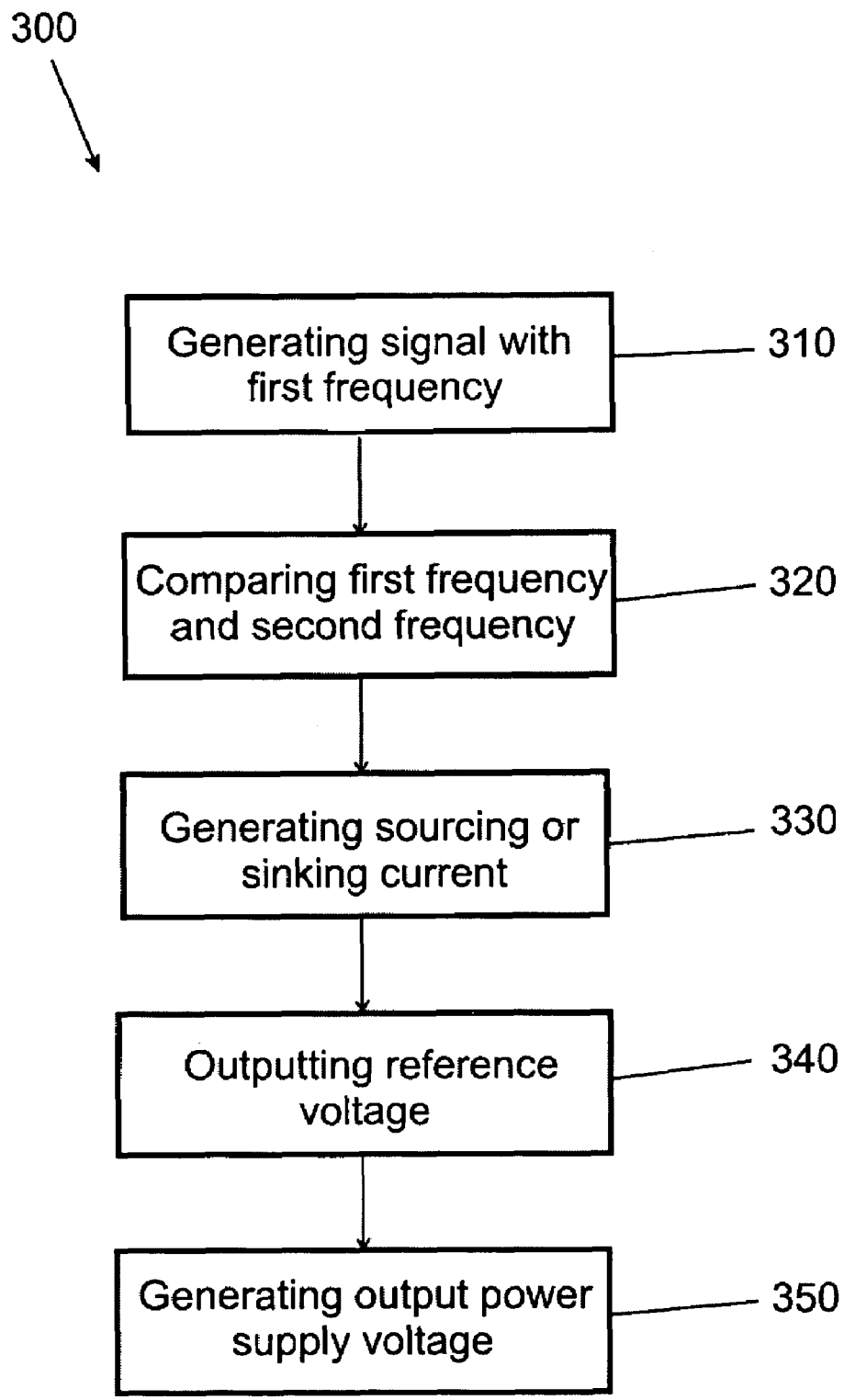
FIG. 3 is a simplified system for adaptive power supply according to an embodiment of the present invention.

FIG. 3 is a simplified system for adaptive power supply according to an embodiment of the present invention. This diagram is merely an example, which should not unduly limit the scope of the claims. One of ordinary skill in the art would recognize many variations, alternatives, and modifications. The method 300 includes the following processes:

1. Process 310 for generating signal with first frequency;
2. Process 320 for comparing first frequency and second frequency;
3. Process 330 for generating sourcing or sinking current;
4. Process 340 for outputting reference voltage;
5. Process 350 for generating output power supply voltage.

Although the above has been shown using a selected group of processes for the method 300, there can be many alternatives, modifications, and variations. For example, some of the processes may be expanded and/or combined. Other processes may be inserted to those noted above. Depending upon the embodiment, the arrangement of processes may be interchanged with others replaced. For example, the method 300 is performed by the system 100. Further details of these processes are found throughout the present specification and more particularly below.

At the process 310, a signal is generated with a first frequency. For example, the signal is generated by an oscillator that includes a delay path with a time delay. In one embodiment, the first frequency is equal to about the inverse of the time delay. In another embodiment, the time delay depends on an output power supply voltage.

For example, the output power supply voltage is used to supply power to a powered system. In one embodiment, the powered system is an integrated system. In another embodiment, the powered system includes one or more blocks of an integrated system. In yet another embodiment, the powered system can slow down the system clock when the powered system does not have to perform many tasks. In yet another embodiment, the powered system adjusts the clock frequency based on at least information associated with a workload of the powered system. The powered system includes a critical path whose time delay is longer than the time delay of any other signal path of the powered system.

In one embodiment, the time delay for the delay path of the oscillator equals the time delay of the critical path of the powered system. In another embodiment, the time delay for the delay path of the oscillator is longer than the time delay of the critical path of the powered system by a predetermined period. In yet another embodiment, both the critical path of the powered system and the delay path of the oscillator are powered by the output power supply voltage.

At the process 320, the first frequency and a second frequency are compared. For example, the second frequency is the frequency of a clock signal received by the powered system. In another example, the comparison includes comparing the edges of the two signals associated with the first frequency and the second frequency respectively. Based on the comparison of the first frequency and the second frequency, either no signal or a signal is generated. For example, if the first frequency and the second frequency are equal, no signal is generated. In another example, if the first frequency is lower than the second frequency, an up signal is generated. In yet another example, if the first frequency is higher than the second frequency, a down signal is generated. In one embodiment, the up signal can cause the output power supply voltage to increase, and the down signal can cause the output power supply voltage to decrease. In another embodiment, the up signal and the down signal each include signal pulses.

At the process 330, a sourcing current or sinking current is generated. For example, if an up signal is received, the sourcing current is generated. If a down signal is generated, the sinking current is generated. In another example, the sourcing current flows from a charge pump, and the sinking current flows to the charge pump. In yet another example, if neither the up signal nor the down signal is received, neither the sourcing current nor the sinking current is generated. In yet another example, if neither the up signal nor the down signal is received, the sourcing current and the sinking current are generated with the same magnitude and cancel each other.

At the process 340, a reference voltage is outputted. For example, the sourcing current or the sinking current are integrated to generate the reference voltage. In another example, a damping process is used. In yet another example, a smoothing process is used to improve stability of the reference voltage.

At the process 350, an output power supply voltage is generated in response to the reference voltage. For example, an input power supply voltage is converted to the output power supply voltage based on at least the reference voltage. In one embodiment, $V_{DDOUT}$ has a linear relationship with $V_{ref}$. For example, $V_{DDOUT}$ equals $V_{ref}$ multiplied by a constant. In another example, $V_{DDOUT}$ equals $V_{ref}$ plus a constant. In yet another example, $V_{DDOUT}$ equals a first constant plus the product of $V_{ref}$ and a second constant. In another embodiment, the output power supply voltage is used to power both the critical path of the powered system and the delay path of the oscillator.

According to another embodiment, a system for adaptively providing a power supply voltage includes an oscillator configured to receive an output voltage and generate a firs signal. The first signal is associated with a first frequency and a first period. Additionally, the system includes a frequency comparator configured to receive the first signal associated with the first frequency and a second signal associated with a second frequency and to generate a third signal if the first frequency and the second frequency are not equal, and a voltage regulator coupled to the frequency comparator and configured to generate the output voltage based on at least information associated with the third signal. The output voltage is received by a powered system, and the powered system is configured to receive a clock signal associated with a clock frequency. The clock frequency is equal to the second frequency. The powered system includes a first signal path associated with a first time delay, and the first period is equal to or longer than the first time delay. The output voltage is adjusted if the first frequency and the second frequency are not equal. For example, the system is implemented according to the system 100.

According to yet another embodiment, a system for adaptively providing a power supply voltage includes an oscillator including a first signal path associated with a first time delay and configured to receive an output voltage and generate a firs signal. The first signal is associated with a first frequency and a first period, and the first time delay is substantially equal to the first period. Additionally, the system includes a frequency comparator configured to receive the first signal associated with the first frequency and a second signal associated with a second frequency and to generate a third signal if the first frequency and the second frequency are not equal, and a voltage regulator coupled to the frequency comparator and configured to adjust the output voltage if the first frequency and the second frequency are not equal. The output voltage is received by a powered system, and the powered system is configured to receive a clock signal associated with a clock frequency and adjust the clock frequency based on at least information associated with a workload of the powered system. The clock frequency is equal to the second frequency. The powered system includes a second signal path associated with a second time delay, and the first period is equal to or longer than the second time delay. For example, the system is implemented according to the system 100.

According to yet another embodiment, a method for adaptively providing a power supply voltage includes receiving an output voltage, and generating a first signal based on at least information associated with the output voltage. The first signal is related to a first frequency and a first period. Additionally, the method includes receiving the first signal associated with the first frequency and a second signal associated with a second frequency, and comparing the first frequency and the second frequency to at least determine whether the first frequency and the second frequency are equal. Moreover, the method includes generating a third signal if the first frequency and the second frequency are not equal, processing information associated with the third signal, and generating the output voltage based on at least information associated with the third signal. The generating the output voltage includes adjusting the output voltage if the first frequency and the second frequency are not equal. The output voltage is received by a powered system, and the powered system is configured to receive a clock signal associated with a clock frequency. The clock frequency is equal to the second frequency. The powered system includes a first signal path associated with a first time delay, and the first period is equal to or longer than the first time delay. For example, the method is implemented according to the method 300.

The present invention has various advantages. Some embodiments of the present invention provide system and method for adaptively providing power supply. Certain embodiments of the present invention can significantly lower power consumption of a powered system. Some embodiments of the present invention identify the critical path of a system powered by a power supply voltage, and determine the time delay of a delay path also powered by the power supply level voltage. For example, the time delay of the delay path is either equal to or longer than the time delay of the critical path. In anther example, the time delay of the delay path is compared with the clock period of the powered system to ensure that the time delay of the critical path is equal to or shorter than the clock period. Certain embodiments of the present invention use a feedback loop to adaptively adjust a power supply voltage. For example, the feedback loop ensures a powered system to be provided with the lowest power supply voltage. In another example, the feedback loop operates based on the principal that the power supply voltage should be adjusted to the minimum level so long as the time delay of the critical path of a powered system is either equal to or short than the period of a clock signal provided to the powered system.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for adaptively providing a power supply voltage, the system comprising:
   an oscillator configured to receive an output voltage and generate a firs signal, the first signal being associated with a first frequency and a first period;
   a frequency comparator configured to receive the first signal associated with the first frequency and a second signal associated with a second frequency and to generate a third signal if the first frequency and the second frequency are not equal;
   a voltage regulator coupled to the frequency comparator and configured to generate the output voltage based on at least information associated with the third signal;
   wherein:
       the output voltage is received by a powered system;
       the powered system is configured to receive a clock signal associated with a clock frequency, the clock frequency being equal to the second frequency;
       the powered system includes a first signal path associated with a first time delay;
       the first period is equal to or longer than the first time delay;
       the output voltage is adjusted if the first frequency and the second frequency are not equal.

2. The system of claim 1 wherein:
   the oscillator includes a second signal path associated with a second time delay;
   the second time delay is substantially equal to the first period.

3. The system of claim 1 wherein:
   the powered system includes the other signal paths associated with the other time delays;
   each of the other time delays is shorter than the first time delay.

4. The system of claim 1 wherein:
   the first time delay depends on the output voltage;
   the first period depends on the output voltage.

5. The system of claim 1 wherein:
   the output voltage is lowered if the first frequency is higher than the second frequency;
   the output voltage is raised if the first frequency is lower than the second frequency.

6. The system of claim 1 wherein the voltage regulator is further configured to:
   receive an input voltage;
   convert the input voltage into the output voltage based on at least information associated with the third signal.

7. The system of claim 1, and further comprising:
   a charge pump configured to receive the third signal and generate a current;
   wherein:
       the current flows to the charge pump if the first frequency is higher than the second frequency;
       the current flows from the charge pump if the first frequency is lower than the second frequency.

8. The system of claim 7, and further comprising a loop filter coupled to the charge pump and configured to generate a reference voltage based on at least information associated with the current.

9. The system of claim 8 wherein the voltage regulator is coupled to the frequency comparator through the loop filter and the charge pump and further configured to receive the reference voltage and adjust the output voltage in response to the reference voltage.

10. The system of claim 1 wherein the second signal and the clock signal are the same.

11. The system of claim 1 wherein the third signal includes an up signal or a down signal.

12. The system of claim 1 wherein the powered system is configured to adjust the clock frequency based on at least information associated with a workload of the powered system.

13. A system for adaptively providing a power supply voltage, the system comprising:
    an oscillator including a first signal path associated with a first time delay and configured to receive an output voltage and generate a firs signal, the first signal being associated with a first frequency and a first period, the first time delay being substantially equal to the first period;
    a frequency comparator configured to receive the first signal associated with the first frequency and a second signal associated with a second frequency and to generate a third signal if the first frequency and the second frequency are not equal;
    a voltage regulator coupled to the frequency comparator and configured to adjust the output voltage if the first frequency and the second frequency are not equal;
    wherein:
        the output voltage is received by a powered system;
        the powered system is configured to receive a clock signal associated with a clock frequency and adjust the clock frequency based on at least information associated with a workload of the powered system, the clock frequency being equal to the second frequency;
        the powered system includes a second signal path associated with a second time delay;
        the first period is equal to or longer than the second time delay.

14. The system of claim 13 wherein:
    the powered system includes the other signal paths associated with the other time delays;
    each of the other time delays is shorter than the second time delay.

15. A method for adaptively providing a power supply voltage, the method comprising:
    receiving an output voltage;
    generating a first signal based on at least information associated with the output voltage, the first signal being related to a first frequency and a first period;
    receiving the first signal associated with the first frequency and a second signal associated with a second frequency;
    comparing the first frequency and the second frequency to at least determine whether the first frequency and the second frequency are equal;
    generating a third signal if the first frequency and the second frequency are not equal;
    processing information associated with the third signal;
    generating the output voltage based on at least information associated with the third signal, the generating the output voltage includes adjusting the output voltage if the first frequency and the second frequency are not equal;
    wherein:
        the output voltage is received by a powered system;
        the powered system is configured to receive a clock signal associated with a clock frequency, the clock frequency being equal to the second frequency;

the powered system includes a first signal path associated with a first time delay;

the first period is equal to or longer than the first time delay.

16. The method of claim 15 wherein:

the powered system includes the other signal paths associated with the other time delays;

each of the other time delays is shorter than the first time delay.

17. The method of claim 15 wherein:

the first time delay depends on the output voltage;

the first period depends on the output voltage.

18. The method of claim 15 wherein the adjusting the output voltage if the first frequency and the second frequency are not equal comprises:

lowering the output voltage if the first frequency is higher than the second frequency;

raising the output voltage if the first frequency is lower than the second frequency.

19. The method of claim 15, and further comprising:

receiving the third signal;

generating a current based on at least information associated with third signal;

wherein:

the current flows in a first direction if the first frequency is higher than the second frequency;

the current flows in a second direction if the first frequency is lower than the second frequency;

the first direction and the second direction are different.

20. The method of claim 19, and further comprising:

processing information associated with the current;

generating a reference voltage based on at least information associated with the current.

21. The method of claim 15 wherein the second signal and the clock signal are the same.

22. The method of claim 15 wherein the third signal includes an up signal or a down signal.

23. The method of claim 15 wherein the powered system is configured to adjust the clock frequency based on at least information associated with a workload of the powered system.

* * * * *